S. CHAMBERS.
RESILIENT MOUNTING FOR VEHICLE BODIES.
APPLICATION FILED JULY 13, 1914.
1,182,457. Patented May 9, 1916.
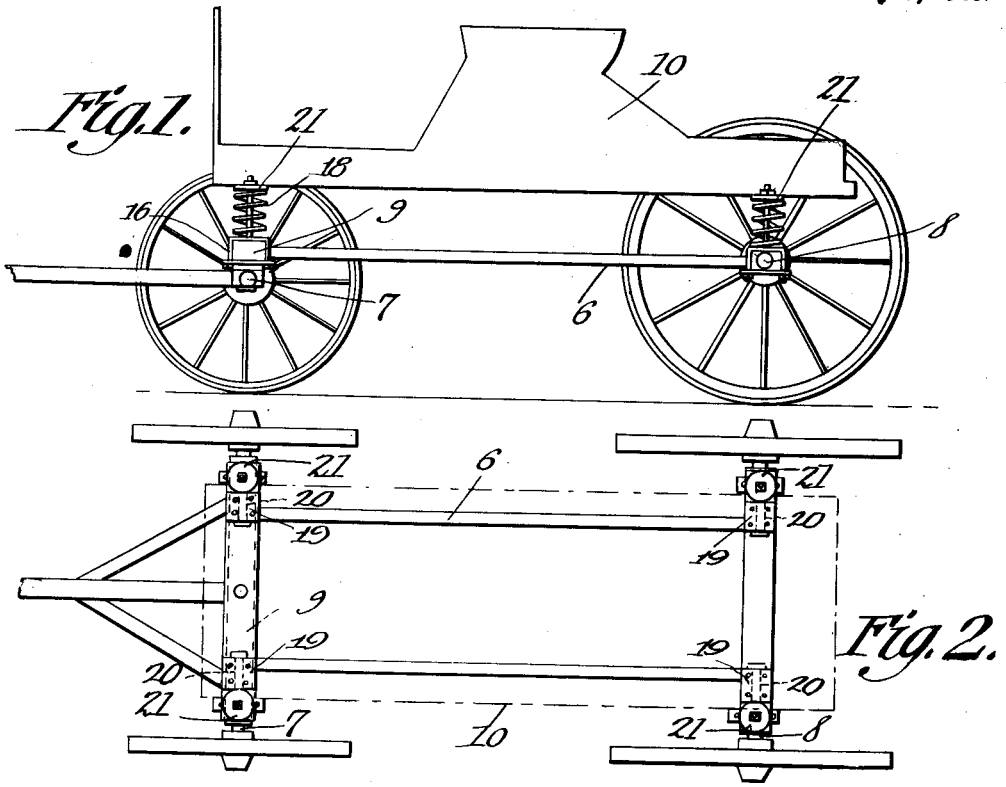
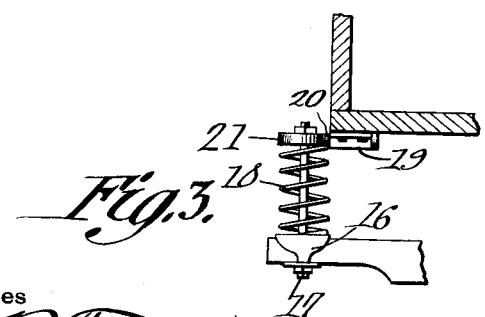

UNITED STATES PATENT OFFICE.

SILAS CHAMBERS, OF TAHOKA, TEXAS.

RESILIENT MOUNTING FOR VEHICLE-BODIES.

1,182,457.   Specification of Letters Patent.   Patented May 9, 1916.

Application filed July 13, 1914. Serial No. 850,692.

*To all whom it may concern:*

Be it known that I, SILAS CHAMBERS, a citizen of the United States, residing at Tahoka, in the county of Lynn and State of Texas, have invented a new and useful Resilient Mounting for Vehicle-Bodies, of which the following is a specification.

This invention relates to resilient mountings for vehicle bodies.

The invention aims primarily to mount a body in such manner as to eliminate the jars and jolts of a vehicle body when mounted upon steel tired wheels.

A further object is to provide a mounting which in addition to limiting the body to motion in a vertical plane, allows for the local absorption and elimination of jars and shocks by allowing the body to tilt, in a restricted but substantially frictionless manner about any of its four points of resilient support.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated.

In said drawings: Figure 1 is a view in side elevation of a wagon body embodying my invention. Fig. 2 is a top plan view thereof with the body removed. Fig. 3 is a detail view of the securing means holding the springs to the wagon body.

Referring to the drawings in which similar reference numerals designate corresponding parts throughout the several views, 6 represents a running gear of a buggy or allied vehicle and includes the front and rear axles 7 and 8. The front axle 7 is pivoted to the forward bolster 9 in the usual manner.

The wagon body 10 is depicted in the present drawings as being of the conventional buggy type, but it will be readily appreciated that it may take any form consistent with its use in connection with and forming a part of the vehicle. Secured to the bottom of the body adjacent each of its corners is a bearing 19. Journaled within these bearings are stub shafts 20 extending inwardly from disks 21 which are provided, in their lower faces, with sockets. Thus each of the disks 21 is capable of rocking about the axis of its stub shaft. The disk is of considerable thickness so that a considerable area or surface will be had for the bearing. A vertical post 15 extends through the said bearing and is rigidly secured, in an upright manner, at its lower extremity by the U-shaped bolt or clip 16. The bolt extends around the axle or bolster, as the case may be, and is tightened thereagainst by the securing nuts 17.

A helical spring 18 extends between and impinges against the lower surface of the disk and the upper surface of the clip or bolt 16, there being four vertical posts and coöperating parts, and there being also four helical springs, thus resiliently mounting the vehicle body and at the same time preventing its relative shifting, in a horizontal plane, with respect to the running gear. With the horizontally rotatable disk, the body may be depressed or elevated to different degrees at its various corners in a vertical and longitudinal plane and is rigidly held against such unequal motions in a vertical and lateral plane and held against all relative motion in a horizontal plane.

The many advantages of the foregoing are readily apparent and result in the smooth and easy riding of a vehicle despite the fact that steel tires are used and the road be other than a smooth surface, although it is to be noted in this connection that the resilient mounting may be employed with equal facility with corresponding success upon automobiles or other types of vehicles.

What is claimed is:—

The combination with an axle and a vehicle body thereabove, of a clip fixedly mounted upon the axle, a bolt fixedly connected to the clip and extending upwardly therefrom, a bearing member secured to the bottom of the body, a disk having a radial stub shaft journaled in the bearing, said disk extending beyond the side of the body and being revoluble about an axis extending transversely of the body, said disk being slidably mounted on the bolt, a spring extending around the bolt and bearing at its ends against the clip and the disk respectively, and means on the bolt and engaged by the disk for limiting the upward movement of the disk under the action of the spring.

In testimony that I claim the foregoing as my own, I have hereto affixed my signature in the presence of two witnesses.

SILAS CHAMBERS.

Witnesses:
McMILL CLAYTON,
J. W. ELLIOTT.